(12) United States Patent
Willis et al.

(10) Patent No.: US 6,225,797 B1
(45) Date of Patent: May 1, 2001

(54) CIRCUIT FOR LIMITING INRUSH CURRENT THROUGH A TRANSISTOR

(75) Inventors: Scott C. Willis, Manassas; Mark J. Jones, Centreville, both of VA (US)

(73) Assignee: Lockheed Martin Corporation, Manassas, VA (US)

( * ) Notice: Subject to any disclaimer, the term of this patent is extended or adjusted under 35 U.S.C. 154(b) by 0 days.

(21) Appl. No.: 09/591,958

(22) Filed: Jun. 12, 2000

Related U.S. Application Data
(60) Provisional application No. 60/174,059, filed on Dec. 30, 1999.

(51) Int. Cl.[7] .................................................. G05B 24/02
(52) U.S. Cl. .......................................... 323/351; 323/908
(58) Field of Search .................................. 323/271, 272, 323/282, 289, 351, 908

(56) References Cited

U.S. PATENT DOCUMENTS

| | | | |
|---|---|---|---|
| 4,254,347 | 3/1981 | Ray | 307/297 |
| 4,849,656 | 7/1989 | Neidorff | 307/360 |
| 4,952,827 | 8/1990 | Leipold et al. | 307/571 |
| 5,079,455 | 1/1992 | McCafferty et al. | 307/568 |
| 5,272,399 | 12/1993 | Tihanyi et al. | 307/572 |
| 5,283,707 * | 2/1994 | Conners et al. | 323/908 |
| 5,376,831 | 12/1994 | Chen | 327/379 |
| 5,504,448 | 4/1996 | Bennett et al. | 327/379 |
| 5,612,582 | 3/1997 | Shichi et al. | 307/130 |
| 5,689,144 | 11/1997 | Williams | 307/130 |
| 5,731,607 | 3/1998 | Kohama | 257/275 |
| 5,744,878 | 4/1998 | Wachter et al. | 307/130 |
| 5,796,274 | 8/1998 | Willis et al. | 327/63 |
| 5,998,977 * | 12/1999 | Hsv et al. | 323/272 |

* cited by examiner

Primary Examiner—Jeffrey Sterrett
(74) Attorney, Agent, or Firm—Dicke, Billig & Czaja, P.A.

(57) ABSTRACT

A power transistor switched power supply connecting a power source to a capacitive load, including a circuit and method for limiting the inrush surge current through the power transistor. The control gate of a junction field effect transistor (JFET) is coupled between the conductive path of the power transistor and the load to sense voltage drop across the power transistor. The conductive controlled path of the JFET is connected to control the impedance of the power transistor. The JFET shunts some of the power transistor control terminal current during the on transition allowing the power transistor to only turn partially on for a period of time, thus limiting the current through the power transistor from the power source to the load. Because the inrush surge current is limited, the accompanying transient power source voltage drop is reduced with less impact to other circuits connected to the power source.

32 Claims, 6 Drawing Sheets

CIRCUIT FOR LIMITING INRUSH CURRENT THROUGH A TRANSISTOR

CROSS REFERENCE TO RELATED APPLICATIONS

This Non-Provisional Utility Patent Application claims the benefit of the filing date of U.S. Provisional Application Ser. No. 60/174,059, filed Dec. 30, 1999, entitled "CIRCUIT AND METHOD FOR LIMITING INRUSH CURRENT THROUGH A MOSFET".

GOVERNMENT INTEREST

This invention was made with Government support under Government Contract No. A012 (Prime Contract No. F33657-88-C-4280) awarded by a Government Agency. The Government has certain rights in this invention.

THE FIELD OF THE INVENTION

The present invention generally relates to a power supply system for electronic devices, and more particularly, to a circuit for limiting the inrush surge current flowing from a power supply system through a transistor, such as a power metal oxide semiconductor field effect transistor (MOSFET), to a capacitive load.

BACKGROUND OF THE INVENTION

A power supply system typically includes transistor, such as a power metal oxide semiconductor field effect transistor (MOSFET), to couple a load to a power source. When the MOSFET is controlled to couple the load having a large capacitive component to the power source, the power MOSFET is fully enhanced and a high transient current, or an inrush surge current, typically flows from the power source to charge the capacitive component of the load. In the absence of any current limiter, the magnitude of the inrush surge current is dependent upon the source impedance, which is typically low. As a result of the inrush surge current, the power source voltage suddenly decreases, then increases relatively slowly as the capacitive load component charges. When a single power source supplies power to several parallel loads, the large inrush surge current which occurs when one load is connected to the single power source can cause the power source voltage to drop below the level needed for proper operation of other connected circuits. In addition, large current surges impose undesirable stress on components.

Complementary metal oxide semiconductor (CMOS) logic arrays present a large capacitive load to a power source that supplies power to the logic array. The large capacitive load is mainly due to the internal gate capacitance and associated de-coupling capacitors. In fact, the effective capacitance of large CMOS dynamic random access memory (DRAM) arrays can exceed the capacitance within the power supply. Printed circuit card de-coupling capacitors are another example of a large capacitive load.

Accordingly, it is known to limit inrush surge current in various ways. In one simple method of limiting inrush surge current, a resistor is connected in series with the capacitive load. When power is turned on to the capacitive load, the resistance limits the surge current. However, an undesirable voltage drop to the capacitive load results from this method. Additionally, unwanted power consumption ($I^2R$ losses) and heat generation are increased.

In a slight modification to the method above, a resistor with a negative temperature coefficient of resistance and significant thermal time constant is connected in series with the capacitive load. As current from the power source flows through the resistor, the resistor heats which decreases its resistance to thereby decrease the $I^2R$ power losses through the resistor. However, this arrangement is ineffective if the resistor is hot when the power is switched on. Additionally, the $I^2R$ power losses in the resistor, while being reduced in normal operation, may still be unacceptably high for certain power sensitive electronic devices.

Another method of limiting inrush surge current is to connect an inductor, which can be designed to provide very little power loss, in series with the load. However, in electronic devices, the necessary size and cost of such an inductor generally makes this alternative undesirable.

Another method of limiting inrush surge current is to connect a resistor in series with the load, and to connect a switch, such as relay contacts or a power transistor, in parallel with the resistor to bypass the resistor when the switch is closed during normal operation. The switch is typically closed after a fixed delay which is greater than the inrush surge current period or in response to the inrush surge current falling below a threshold level. If the switch is isolated after a fixed delay, this inrush surge current limiting method typically has an undesirably long fixed delay. On the other hand, an undesirably complicated and/or sensitive sensing and control circuit is required to control the switch in response to the inrush surge current falling below a threshold level.

Another method of limiting inrush surge current is to add a large amount of additional power supply de-coupling capacitance. However, this method of limiting inrush surge current adds significantly to the size, weight, and cost of the power supply, and can lead to power supply control loop instability.

A further method to limit current flow through a MOSFET is to connect a voltage divider in parallel with a series circuit including the power MOSFET and the capacitive load. A node of the voltage divider is connected to a control terminal of a control transistor. The control transistor has a load path connected between a gate and a source of the power MOSFET. The control transistor is controlled by the voltage at the node of the voltage divider such that if the drain-to-source voltage of the power MOSFET exceeds a pre-determined voltage value the control transistor conducts. Examples of such voltage divider configurations are described in the Leipold et al. U.S. Pat. No. 4,952,827 and the Tihanyi et al. U.S. Pat. No. 5,272,399, which are both herein incorporated by reference. Such circuit configurations are designed to prevent steady state overcurrent conditions rather than inrush surge current and additionally, include a significant number of components.

Adding additional MOSFET gate-to-source capacitance helps very little to limit the inrush surge current, since it mainly delays the onset rather than slowing the transition through the threshold region, permitting the MOSFET to transition from off to fully on over a short time period. Correspondingly, the load capacitance charges within the short MOSFET transition time period. Extending the period of time it takes for the MOSFET gate voltage to pass through the threshold region extends the time of the MOSFET's reduced current-passing capacity, allowing the capacitive load to charge more slowly at lower current levels. A resistor may be used to sense current, with a feedback path including an operational amplifier; however, such a solution requires a large number of components and adds additional voltage drop in the path between source and load that is not compensated for by the sense leads.

To avoid the shortcomings of the above-discussed techniques and for other reasons presented in the Description of the Preferred Embodiments, a need exits for a simple circuit, using a minimal number of components, and method to limit inrush surge current from a power supply system, through a power MOSFET, to a capacitive load.

SUMMARY OF THE INVENTION

The present invention provides a power supply system which provides power to a capacitive load. The power supply system includes a power source having a ground terminal coupled to a ground reference and a positive power terminal. A switch, such as a transistor, has a first terminal coupled to the power source power terminal, a second terminal coupled to the capacitive load, and a control terminal. A field effect transistor (FET) has a gate coupled to the second terminal of the transistor, a source coupled to the first terminal of the transistor, and a drain. A capacitor is coupled between the control terminal of the transistor and the drain of the FET.

In one embodiment, the transistor is a metal oxide semiconductor field effect transistor (MOSFET) having a drain as a the first terminal, a source as a second terminal, and a gate as the control terminal. The power supply system operates such that the FET diverts some of the MOSFET gate current while the MOSFET turns on, preventing the MOSFET from fully turning on, thus limiting the current through the MOSFET to charge the capacitive load. Charging the capacitor provides a delay time, after which, the MOSFET is allowed to turn on fully.

In one embodiment of the power supply system according to the present invention, the MOSFET is an N-channel power MOSFET; however, P-channel MOSFETs may also be used for certain applications. In one embodiment, the FET is a depletion mode junction field effect transistor (JFET).

In one embodiment, a MOSFET controller is coupled between the power source bias voltage terminals and the gate of the power MOSFET. In response to control commands, from a microprocessor for example, the MOSFET controller applies either a negative bias voltage to the gate of the power MOSFET to turn it off, or a positive bias voltage to the gate of the power MOSFET to turn it on.

In a further embodiment, two MOSFETs are placed in series back-to-back (i.e., the MOSFET sources are coupled together) to achieve a fault tolerant MOSFET driver. The drain of one MOSFET is coupled to the power source, the drain of the other MOSFET is coupled to the capacitive load. Faults on either side of the MOSFET pair will not propagate through the MOSFET pair while they are off since the intrinsic diodes of the MOSFETs are oriented in different directions. The MOSFET driver controls both MOSFETs simultaneously. The series JFET and drain capacitor coupled to one of the MOSFETs limits inrush surge current as the MOSFETs are switched on.

In one embodiment, two fault tolerant power supply systems are coupled in parallel to a capacitive load. An inrush surge current limiting circuit according to the present invention is coupled to the MOSFET driver of each power source. An additional MOSFET controller negative bias output is coupled to the MOSFET driver of the opposite parallel power supply system to provide a redundant negative bias source ensuring each MOSFET driver is held in the off state upon the failure its associated power source.

One form of the present invention provides a method of energizing a capacitive load and limiting the inrush surge current flowing to the capacitive load coupled to a power supply system through a transistor by maintaining an isolation impedance of the transistor at a first level to inhibit power flow to the capacitive load. The isolation impedance of the transistor is decreased from the first level to a second level to provide power to the capacitive load. Voltage drop across the transistor is sensed and maintained at a threshold level for a fixed period of time. Finally, the transistor isolation impedance is decreased from the second level to a third level to fully turn on the transistor.

In accordance with the present invention, a circuit and method are provided to control a transistor, such as a power MOSFET, coupling a power supply system to a capacitive load to limit the inrush surge current by diverting a portion of gate current to prevent the transistor from turning on fully for a delay period. The capacitive load charges with limited current during the delay period. The delay period is controlled by charging and discharging a capacitor in one embodiment. In a further embodiment, diversion of the MOSFET gate current is controlled using a field effect transistor (FET) having a gate coupled to the source of the MOSFET.

The present invention can be implemented using fewer components than conventional methods with an accompanying reduction in cost and physical space requirements. At the same time efficiency and reliability are improved. These benefits are particularly important in high efficiency, low power equipment including outer-space applications and portable electronic devices, such as cellular phones, laptop computers, pagers, personal digital assistants, and the like. The present invention can be implemented in harsh radiation and temperature environments, such as space, using readily-available components inherently radiation/temperature tolerant rather than limited, more expensive, radiation-hardened/space-qualified components.

Finally, unlike some conventional inrush surge current limiting methods, a component failure within the present invention may defeat the surge current limiting characteristics, but will not obstruct the capability to energize the capacitive load.

BRIEF DESCRIPTION OF THE DRAWINGS

The invention will be further understood from the following description with reference to the accompanying drawings, in which similar references are used in different figures to denote similar components.

DESCRIPTION OF THE PREFERRED EMBODIMENTS

In the following detailed description of the preferred embodiments, reference is made to the accompanying drawings, which form a part hereof, and in which is shown by way of illustration, specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
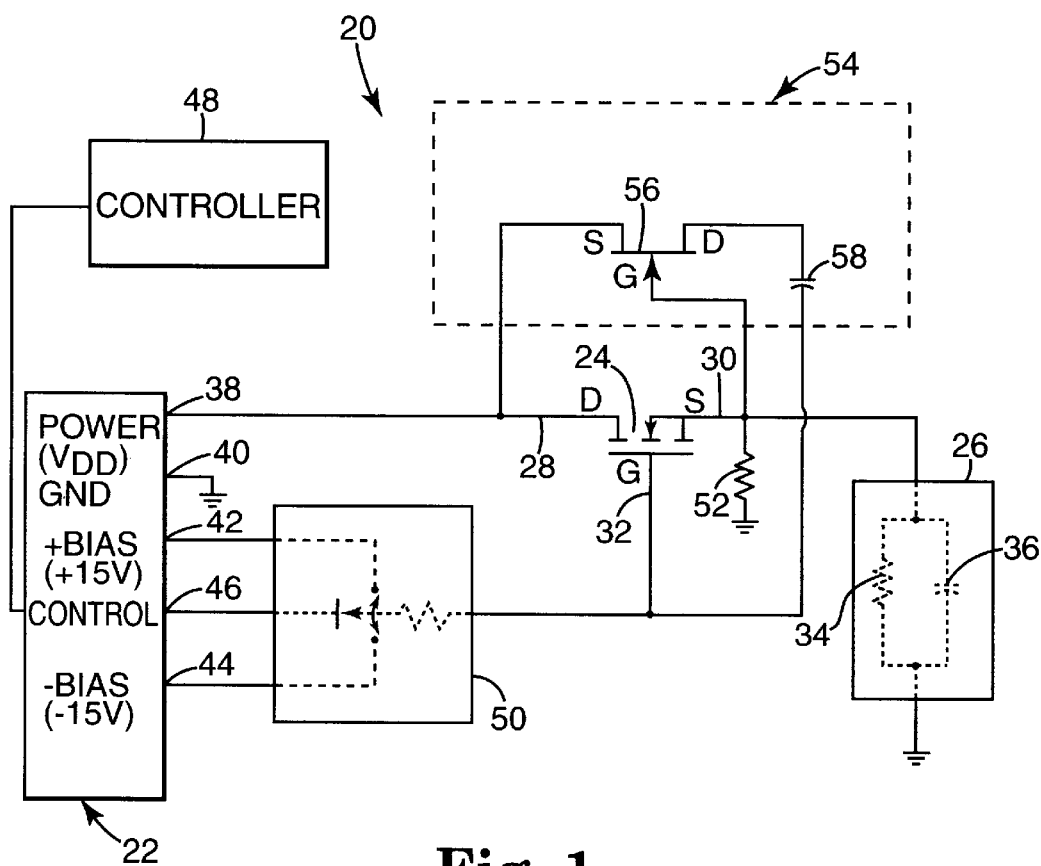
FIG. 1 is a schematic and block diagram of one embodiment of a capacitive load and a power supply system for supplying power to the capacitive load and including a power source, a MOSFET driver, and a current limiting circuit according to the present invention.

A power supply system according to the present invention is illustrated generally at 20 in FIG. 1. In one embodiment, power supply system 20 includes a power source 22 and a transistor 24, functioning essentially as a switch, for coupling power source 22 to a load 26. Transistor 24 presents an isolation impedance between power source 22 and load 26. When transistor 24 is off, the isolation impedance is high. When transistor 24 is on, the isolation impedance is much lower to provide power from power source 22 to load 26. Irush surge current is controlled by controlling the magnitude of transistor 24 isolation impedance for an initial period of time.

In one embodiment, transistor 24 has a first terminal 28, a second (reference) terminal 30 and a control terminal 32. FIG. 1 illustrates a preferred embodiment where transistor 24 is a metal oxide semiconductor field effect transistor (MOSFET) 24, wherein first terminal 28 is a drain terminal, second terminal 30 is a source terminal, and control terminal 32 is a gate terminal. In one embodiment, load 26 includes a resistive component, indicated at 34, and a capacitive component, indicated at 36. Optionally, MOSFET 24 is a power MOSFET.

Power source 22 has a power terminal 38 (e.g., 3.3V) for supplying power ($V_{supply}$ or $V_{DD}$) to load 26, a ground terminal 40, a positive bias terminal 42 (e.g., +15 V with respect to ground), a negative bias terminal 44 (e.g., -15V with respect to ground), and a control terminal 46. Power terminal 38 is coupled to the drain of MOSFET 24. In one embodiment, power terminal 38 polarity is positive with respect to ground terminal 40. In an alternative embodiment, power terminal 38 polarity is negative with respect to ground terminal 40. Power source 22 is optionally a stored energy source. Positive bias terminal 42, negative bias terminal 44 and control terminal 46 are optionally provided directly from controller 48. Controller 48 can be implemented with any suitable controller, such as a microprocessor, a microcontroller, a programmable logic device, or a state machine.

The source of MOSFET 24 is coupled to load 26. Control terminal 46 provides different logic level commands from a controller 48 to a MOSFET controller 50. MOSFET controller 50 couples and decouples bias terminals 42 and 44 to the gate of MOSFET 24.

In one embodiment, MOSFET 24 is an N-channel enhancement mode device. A source-grounding resistor 52 is coupled between the source of MOSFET 24 and ground. In one embodiment, a suitable value for source-grounding resistor 52 is approximately 47 KΩ.

An inrush surge current limiting circuit 54 comprises a field effect transistor (FET) 56 and a drain capacitor 58. In one embodiment, FET 56 is an N-channel depletion mode junction field effect transistor (JFET). JFET 56 has a source coupled to the drain of MOSFET 24. The drain of JFET 56 is coupled to a first terminal of drain capacitor 58. A second terminal of drain capacitor 58 is coupled to the gate of MOSFET 24. The gate of JFET 56 is coupled to the source of MOSFET 24.

In operation, power source 22, via control terminal 46, provides a suitable logic level command to MOSFET controller 50 causing positive bias terminal 42 to be coupled to the gate of MOSFET 24, which turns on MOSFET 24 decreasing the isolation impedance of MOSFET 24 from a high level to a lower level to thereby couple power source 22 to load 26. To decouple power source 22 from load 26, power source 22, via control terminal 46, provides a logic level command to MOSFET controller 50 causing negative bias terminal 44 to be coupled to the gate of MOSFET 24 which turns off MOSFET 24.

Figure 2A:
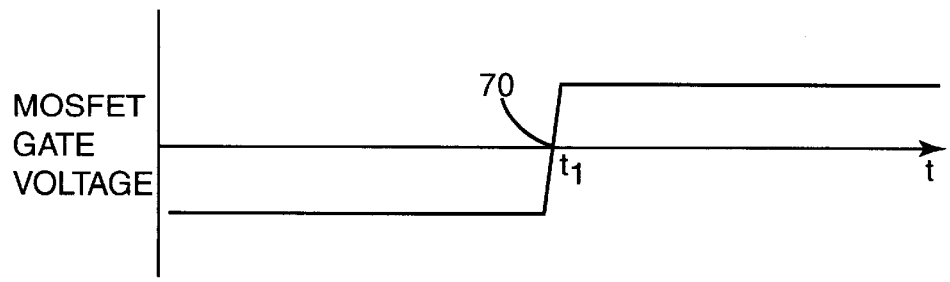
FIGS. 2A and 2B are timing diagrams illustrating voltage characteristics of a prior art power supply system as it is coupled to a capacitive load via a MOSFET driver without the current limiting circuit of the present invention.
Figure 2B:
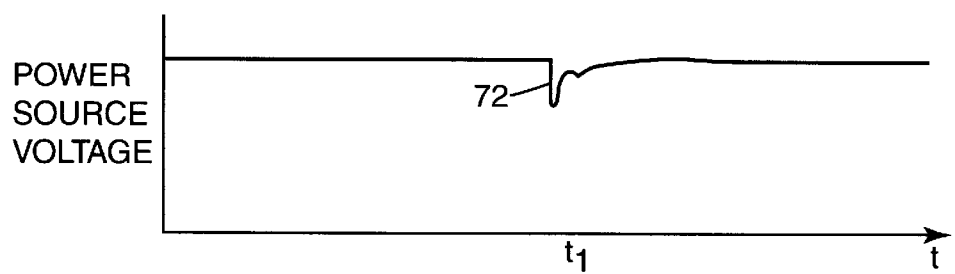

FIGS. 2A and 2B illustrate voltage characteristics as a function of time t, for a conventional power supply system, via a MOSFET not equipped with an inrush surge current limiting circuit, energizing a capacitive load at time tl. Gate voltage of the switched MOSFET is illustrated in FIG. 2A. Corresponding power source bus voltage is illustrated in FIG. 2B. Without a current limiting circuit, the MOSFET gate voltage transitions from negative to positive, as indicated at 70 in FIG. 2A, turning on MOSFET 24. A dip in power source bus voltage occurs, as indicated at 72 in FIG. 2B, due to the inrush surge current through the MOSFET to the capacitive load.

Figure 3A:
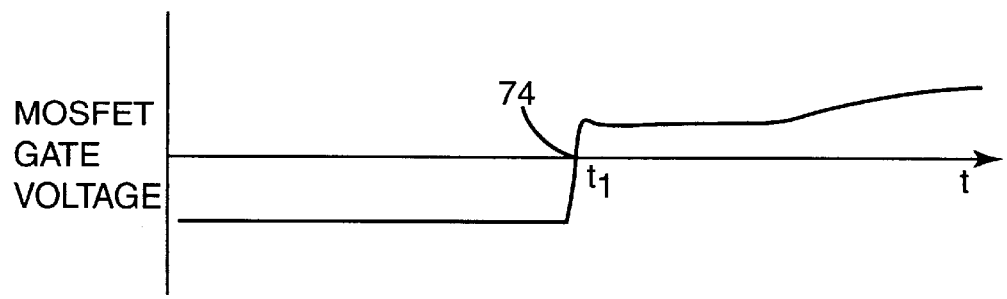
FIGS. 3A and 3B are timing diagrams illustrating voltage characteristics of the power supply system of FIG. 1 according to one embodiment of the present invention as the power supply system is coupled to a capacitive load via a MOSFET driver.
Figure 3B:
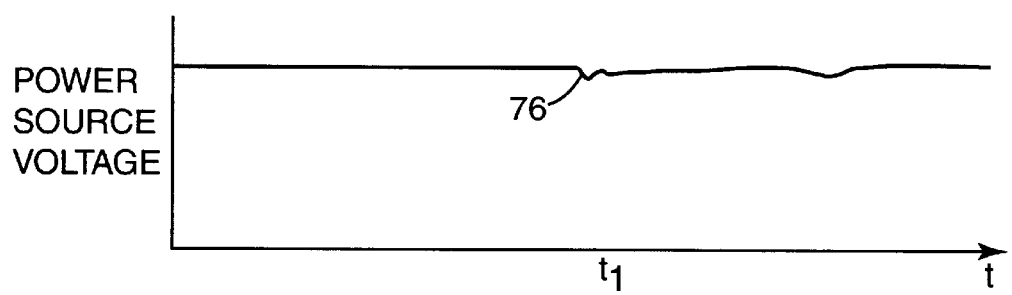

FIGS. 3A and 3B illustrate voltage characteristics as a function of time t, for power supply system 20 according to the present invention, including MOSFET 24 with inrush surge current limiting circuit 54, energizing capacitive load 26 at time t1. Gate voltage of switched MOSFET 24 is illustrated in FIG. 3A. Corresponding power source 22 bus voltage is illustrated in FIG. 3B. With inrush surge current limiting circuit 54, MOSFET 24 gate voltage begins to transition from negative bias 44 voltage (e.g., -15V) to positive bias 42 voltage (e.g., +15V), as indicated at 74 in FIG. 3A. MOSFET 24 gate voltage pauses at the threshold voltage ($V_{t(MOSFET)}$) of MOSFET 24, only partially turning on MOSFET 24, thus limiting the current passing capacity of MOSFET 24. A much smaller dip in power source 22 bus voltage results, as indicated at 76 in FIG. 3B.

Referring to FIGS. 1, 3A and 3B, the operation of power supply system 20 of FIG. 1, including current limiting circuit 54, is described as follows. In the configuration illustrated in FIG. 1, JFET 56 shunts some of MOSFET 24 gate current (i.e., transistor control terminal charging current) as MOSFET 24 turns on. JFET 56 also charges drain capacitor 58 when MOSFET 24 is off.

In steady state, MOSFET controller 50 causes negative bias terminal 44 to be coupled to the gate of MOSFET 24 keeping it off. The isolation impedance of MOSFET 24 is at a first (high) level. Load 26 is decoupled from power source 22, and the source of MOSFET 24 is coupled to ground through source-grounding resistor 52. JFET 56 is off because its gate-source voltage ($V_{gs}$) is equal to $-V_{supply}$ (e.g., −3.3V), which is slightly greater in magnitude than the threshold voltage ($V_{t(JFET)}$) of JFET 56 (e.g., $V_{t(JFET)}$ approximately −2.7V at $I_d$ of 1mA). With the gate of MOSFET 24 held at the negative bias 44 voltage (e.g., −15V), drain capacitor 58 charges through an intrinsic JFET gate-to-drain diode and source-grounding resistor 52 coupled to ground. Drain capacitor 58 charges to approximately the positive bias 42 voltage (e.g., +15V), with a polarity such that the second terminal of drain capacitor 58, coupled to the gate of MOSFET 24, is more negative than the first terminal of drain capacitor 58, coupled to the drain of JFET 56.

When a suitable logic level command is provided to MOSFET controller 50 from power source 22 via control terminal 46, positive bias terminal 42 is coupled to the gate of MOSFET 24 to thereby apply a bias voltage across the gate of MOSFET 24 and the source of MOSFET 24. The source of MOSFET 24 is a reference terminal since it is coupled to ground through source-grounding resistor 52. With the bias voltage applied across its gate and source, MOSFET 24 starts transitioning to the on state. The isolation impedance of MOSFET 24 is decreased from a first (high) level to a second (intermediate) level. The gate voltage of MOSFET 24 rises to $V_{t(MOSFET)}$. The voltage drop across the isolation impedance of MOSFET 24 ($-V_{ds}$) is sensed as a control voltage by JFET 56. As MOSFET 24 begins to turn on, $V_{gs}$ of JFET 56, equal to the negative drain-source voltage ($-V_{ds}$) of MOSFET 24, drops until it reaches $V_{t(JFET)}$. JFET 56 turns on diverting MOSFET 24 gate current (i.e. transistor control terminal charging current) from MOSFET controller 50 positive bias 42 (e.g., +15V) and prevents MOSFET 24 from turning on fully until drain capacitor 58 is charged to the opposite polarity (e.g., +15V) with a polarity such that drain capacitor 58 second terminal, coupled to the gate of MOSFET 24, is more positive than drain capacitor 58 first terminal, coupled to the drain of JFET 56. Drain capacitor 58 maintains the voltage drop across MOSFET 24 ($-V_{ds}$), sensed by JFET 56, essentially constant for a fixed period of time until drain capacitor 58 charges, after which, MOSFET 24 can turn on fully decreasing its isolation impedance to third (low) level.

While MOSFET 24 is held only partially on, current flow through MOSFET 24 is limited by the second (intermediate) level isolation impedance of MOSFET 24 and load capacitance 36 charges up more slowly. The transient voltage reduction at power source 22 power terminal 38 is not as dramatic as a result as indicated at 76 in FIG. 2.

During MOSFET 24's transition to the on state, JFET 56 is in the forward mode since its drain voltage is pushed up from MOSFET 24 gate voltage by drain capacitor 58. JFET 56 continues in the forward active region until drain capacitor 58 charges. JFET 56 drain current falls to zero as drain capacitor 58 second terminal reaches positive bias 42 voltage (e.g., +15V). As drain capacitor 58 charging current decreases, MOSFET 24's gate charge current (i.e., transistor control terminal charging current) is restored and MOSFET 24 turns on fully. The size of drain capacitor 58 determines how long $V_{ds}$ is held constant and thus, how long load 26 has to pre-charge with limited current through MOSFET 24.

When MOSFET 24 is on and in steady state, its isolation impedance is at its third (lowest) level and power source 22 is coupled to load 26. Since MOSFET 24 $V_{ds}$ is equal in magnitude to JFET 56's $V_{gs}$, JFET 56 is on, but no DC current can flow from the gate through drain capacitor 58. Drain capacitor 58 is charged to positive bias 42 voltage (e.g., +15V) with a polarity such that drain capacitor 58 second terminal, coupled to the gate of MOSFET 24, is more positive.

To isolate power source 22 from load 26, a logic level command on control terminal 48 causes negative bias terminal 44 to be coupled to the gate of MOSFET 24 via MOSFET controller 50. Negative bias terminal 44 voltage (e.g., −15V) is applied to the gate of MOSFET 24, with respect to the source of MOSFET 24, causing MOSFET 24 to begin transition to the off state. Since JFET 56 is originally in the active region, drain capacitor 58 charges in reverse polarity (i.e., drain capacitor 58 second terminal, coupled to the gate of MOSFET 24, is more negative than drain capacitor 58 first terminal, coupled to the drain of JEFT 56).

For optimum operation of inrush surge current limiting circuit 54 in this embodiment, $V_{T(JFET)}$ should be slightly smaller in magnitude than power source 22 power terminal 38 voltage in order to control $V_{ds}$ of MOSFET 24. If $V_{t(JFET)}$ is too small, resulting in a smaller MOSFET 24 Vds voltage drop, a larger inrush current to load 26 will result. If $V_{t(JFET)}$ is too large, JFET 56 will stay on, not allowing MOSFET 24 to turn on at all until drain capacitor 58 charge is depleted, negating the purpose of inrush surge current limiting circuit 54 by simply delaying turn on of MOSFET 24. Also, JFET 56 $I_{DSS}$ should be much greater (i.e., at least four times) than the peak current to have ample drive capability while keeping MOSFET 24 $V_{ds}$ fairly constant. JFET 56 threshold voltage ($V_{t(JFET)}$) characteristics are fairly independent of radiation and temperature in typical space environment applications.

Figure 4:
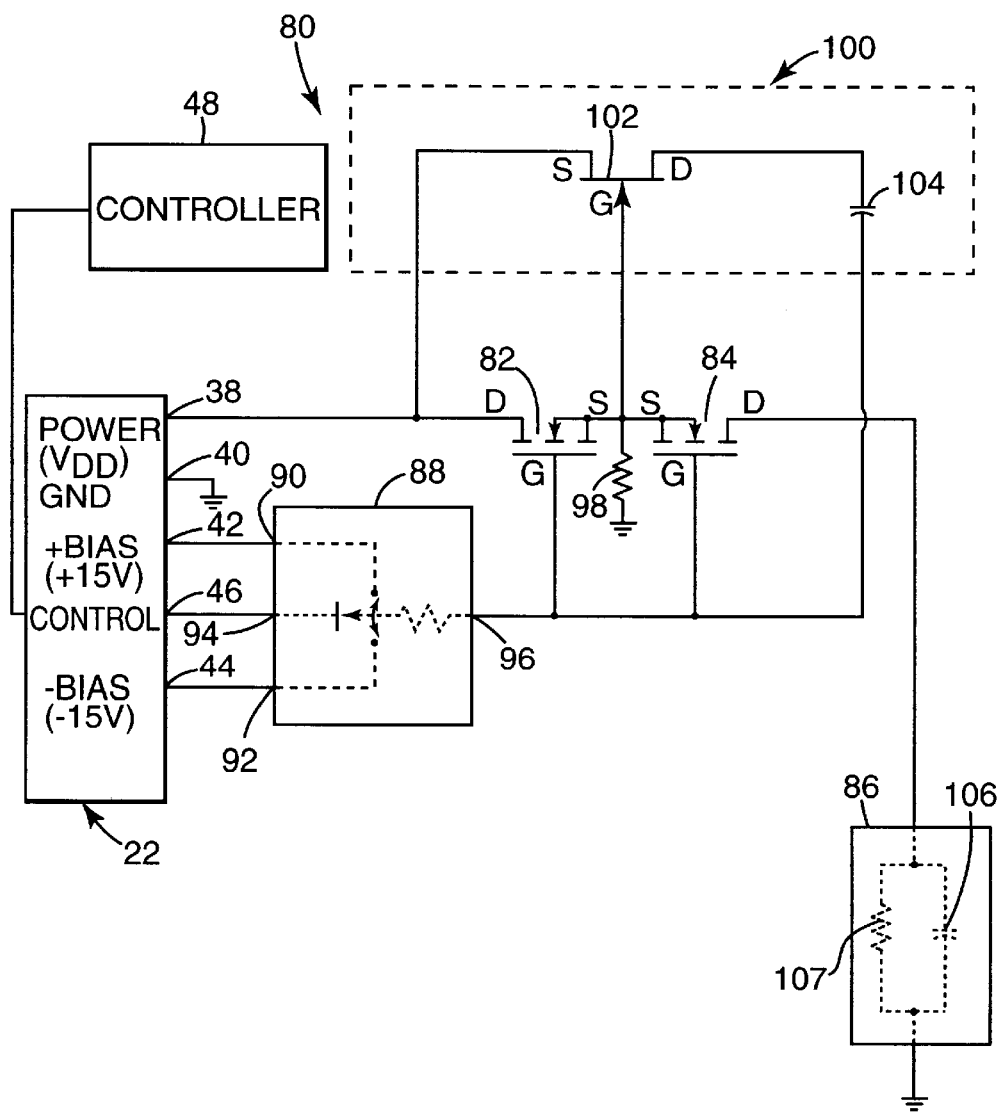
FIG. 4 is a schematic and block diagram of one embodiment of a capacitive load and a power supply system for supplying power to the capacitive load and including a power source, a fault tolerant MOSFET driver, and a current limiting circuit according to the present invention.

In accordance with another embodiment of the invention, a power supply system is illustrated generally at 80 in FIG. 4. Power supply system 80 includes power source 22, a first MOSFET 82, and a second MOSFET 84 for coupling power source 22 to a load 86. First and second MOSFETs, 82 and 84 respectively, may be power MOSFETs, and furthermore, may be either N-channel or P-channel type, preferably both of the same type.

The drain of first MOSFET 82 is coupled to power terminal 38 of power source 22. The source of MOSFET 82 is coupled to the source of second MOSFET 84. The drain of second MOSFET 84 is coupled to load 86. The gate of first MOSFET 82 is coupled to the gate of second MOSFET 84.

MOSFET controller 88 has a first bias input terminal 90, a second bias input terminal 92, a control input terminal 94 and a bias output terminal 96. Control terminal 46 of power source 22 is coupled to control input terminal 94 and provides different logic level commands to MOSFET controller 88. First bias input terminal 90 is coupled to positive bias terminal 42 of power source 22. Second bias input terminal 92 is coupled to negative bias terminal 44 of power source 22. Bias output terminal 96 is coupled to the gates of first MOSFET 82 and second MOSFET 84. MOSFET controller 88 couples and decouples bias terminals 42 and 44 to the gates of first MOSFET 82 and second MOSFET 84.

In one embodiment, first MOSFET 82 and second MOSFET 84 are Nchannel enhancement mode devices. A source-grounding resistor 98 is coupled between ground and the sources of first MOSFET 82 and second MOSFET 84. In one embodiment, a suitable value for source-grounding resistor 98 is approximately 47 KΩ.

An inrush surge current limiting circuit 100, comprises a field effect transistor (FET) 102 and a drain capacitor 104. In one embodiment, FET 102 is an N-channel depletion mode junction field effect transistor (JFET). JFET 102 has a source coupled to the drain of first MOSFET 82. The drain of JFET 102 is coupled to a first terminal of drain capacitor 104. A second terminal of drain capacitor 104 is coupled to the gates of first MOSFET 82 and second MOSFET 84. The gate of JFET 102 is coupled to the sources of first MOSFET 82 and second MOSFET 84 and the ungrounded terminal of source-grounding resistor 98.

In steady state, MOSFET controller 88 causes negative bias terminal 44 to be coupled to the gates of first MOSFET 82 and second MOSFET 84, keeping them off. Load 86 is decoupled from power source 22. The sources of first MOSFET 82 and second MOSFET 84 are coupled to ground through source-grounding resistor 98. JFET 102 is off because its gate-source voltage ($V_{gs}$) is equal to $-V_{supply}$ (e.g., −3.3V), which is slightly greater in magnitude than the threshold voltage ($V_{t(JFET)}$) of JFET 102. With the gates of first MOSFET 82 and second MOSFET 84 held at the negative bias 44 voltage (e.g., −15V), drain capacitor 104 charges through an intrinsic JFET gate-to-drain diode and source grounding resistor 98 coupled to ground. Drain capacitor 104 charges to approximately the power source 22 negative bias 44 voltage (e.g., −15V). Drain capacitor 104 second terminal, coupled to the gates of first MOSFET 82 and second MOSFET 84, is more negative than drain capacitor 104 first terminal, coupled to the drain of JFET 102.

When a suitable logic level command is provided to MOSFET controller 88 from power source 22 via control terminal 46, positive bias terminal 42 is coupled to the gates of first MOSFET 82 and second MOSFET 84 to thereby apply a bias voltage to the gates of first MOSFET 82 and second MOSFET 84 with respect to their sources. The sources of MOSFETs 82 and 84 are reference terminals since they are coupled to ground through source-grounding resistor 98. With bias voltage applied across their gates and sources, first MOSFET 82 and second MOSFET 84 begin transition to the on state. The gate voltage of first MOSFET 82 and second MOSFET 84 rise to $V_{t(MOSFET)}$. As first MOSFET 82 and second MOSFET 84 begin to turn on, $V_{gs}$ of JFET 102, which is equal to the negative drain-source voltage ($-V_{ds}$) of first MOSFET 82, drops until it reaches $V_{t(JFET)}$. JFET 102 turns on diverting first MOSFET 82 and second MOSFET 84 gate current (i.e., transistor control terminal charging currents) from MOSFET controller 88 positive bias 42 voltage (e.g., +15V) and preventing first MOSFET 82 and second MOSFET 84 from turning on fully until drain capacitor 104 is charged to the opposite polarity. While first MOSFET 82 and second MOSFET 84 are held only partially on, current flowing through first MOSFET 82 and second MOSFET 84 is limited and load capacitance 106 charges up more slowly. Load resistance 107 is energized as well. The voltage transient at power source 22 power terminal 38 is less pronounced compared to the transient without inrush surge current limiting circuit 100.

During the on transition of first MOSFET 82 and second MOSFET 84, JFET 102 is in the forward mode since its drain voltage is pushed up from the gate voltage of first MOSFET 82 and second MOSFET 84 by drain capacitor 104. JFET 102 continues in the forward active region until drain capacitor 104 charges. JFET 102 drain current falls to zero as drain capacitor 104 reaches positive bias 42 voltage (e.g., +15V) on its second terminal, coupled to the gates of first MOSFET 82 and second MOSFET 84. As drain capacitor 104 charging current decreases, first MOSFET 82 and second MOSFET 84 gate charge current (i.e. transistor control terminal charging current) is restored and first MOSFET 82 and second MOSFET 84 turn on fully. The size of drain capacitor 104 determines how long $V_{ds}$ is held constant and thus, how long load 86 has to pre-charge with limited current through first MOSFET 82 and second MOSFET 84.

To isolate power source 22 from load 86, a logic level command on control terminal 46 causes negative bias terminal 44 to be coupled to the gates of first MOSFET 82 and second MOSFET 84 via MOSFET controller 88. Negative bias terminal 44 voltage (e.g., −15V), applied the gates with respect to the sources of MOSFETs 82 and 84 respectively cause MOSFETs 82 and 84 to begin transition to the off state. Since JFET 102 is originally in the active region, drain capacitor 104 charges in reverse polarity (i.e., drain capacitor 104 second terminal, coupled to the gates of MOSFETs 82 and 84, is more negative than drain capacitor 104 first terminal, coupled to the drain of JEFT 102). The intrinsic second MOSFET 84 diode prevents JFET 102's gate-to-source diode from being damaged during the off transition when reverse current could flow from load capacitance 106 to another parallel load, until MOSFET 82 is switched off completely.

The power supply systems 20 and 80 according to the present invention include inrush surge current limiting circuits 54 and 100 respectively which are highly reliable. For example, in power supply system 80 of FIG. 4, if either JFET 102 or drain capacitor 104 fail, they typically become an open circuit and the operation of power supply system 80 reverts back to the characteristics observed when inrush surge current limiting circuit 100 was not present. In other words, open circuit failures in inrush surge current limiting circuit 100, do not prevent coupling power source 22 to load 86.

Furthermore, the inrush surge current limiting circuits, 54 and 100 respectively, dynamically adjust switching speed to reduce inrush surge current, even when power source 22 voltage is drooping. The AC coupled inrush surge current limiting circuits, 54 and 100 respectively, are more reliable and tolerant of JFET failures since interference is avoided with DC operating points which could otherwise prevent proper switching.

Power supply system 80 illustrated in FIG. 4 includes second MOSFET 84 in series with first MOSFET 82. Such a back-to-back (i.e., source-to-source) configuration of N-channel MOSFETs creates a fault tolerant MOSFET driver. Coupling the sources of first MOSFET 82 and second MOSFET 84 together place the polarities of the parasitic diodes present in all power MOSFETs in opposite polarities. As such, no diode current can conduct through the back-to-back configuration of MOSFETs 82 and 84 when MOSFETs 82 and 84 are off. Therefore, a fault on either side of MOSFETs 82 and 84 will not propagate through the back-to-back MOSFET configuration to the opposite side of MOSFETs 82 and 84.

Figure 5:
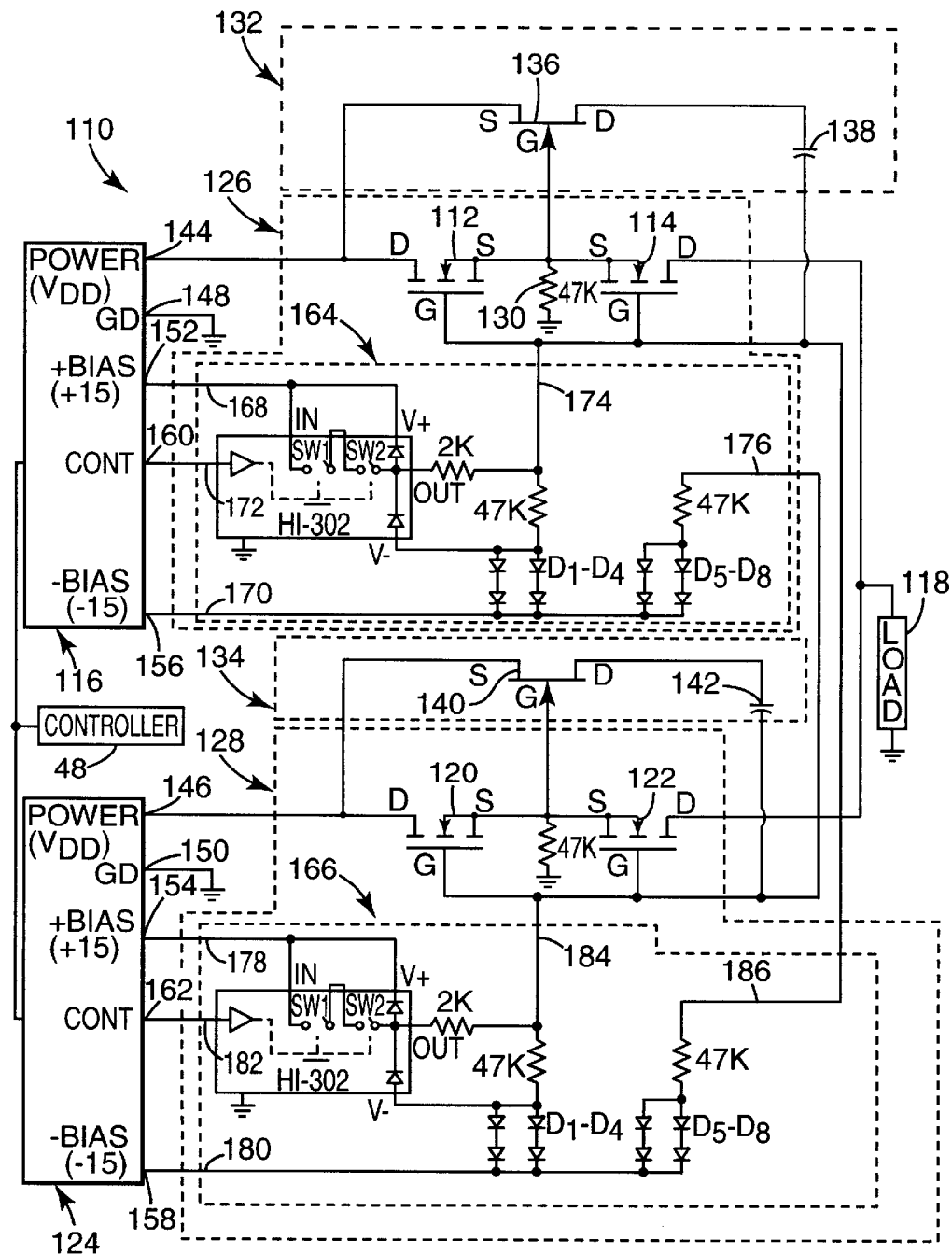
FIG. 5 is a schematic and block diagram of one embodiment of a capacitive load and a power supply system for supplying power to the capacitive load and including dual-redundant power sources, fault tolerant N-channel MOSFET drivers, and current limiting circuits according to the present invention.

In accordance with another embodiment of the invention, a power supply system is illustrated generally at 110 in FIG. 5. Power supply system 110 includes a pair of back-to-back MOSFETs, a first MOSFET 112 and a second MOSFET 114, coupling a first power source 116 to a load 118. A third MOSFET 120 and a fourth MOSFET 122, another pair of back-to-back MOSFETs, couple load 118 to second power source 124. As will be appreciated by those skilled in the art, power sources 116 and 124 in combination provide a redundant source of power to load 118. It will be further appreciated that the back-to-back coupling (i.e., source to source) of the MOSFET pairs prevents faults from propagating across the MOSFET pairs when the respective MOSFETs are in an off state (i.e., non-conducting state). Thereby, power supply system 110 is comprised of dual-redundant power sources and fault tolerant MOSFET drivers, first MOSFET driver 126 and second MOSFET driver 128 respectively.

The source of first MOSFET 112 is coupled to the source of second MOSFET 114. The drain of second MOSFET 114 is coupled to load 118. The gate of first MOSFET 112 is coupled to the gate of second MOSFET 114. A first source-grounding resistor 130 is coupled between ground and the sources of first MOSFET 112 and second MOSFET 114. In one embodiment, a suitable value for first source-grounding resistor 130 is approximately 47 KΩ.

The Willis et al. U.S. Pat. No. 5,796,274, which is assigned to the assignee of the present application, and which is herein incorporated by reference details the construction and operation of dual-redundant, fault-tolerant power supply systems. An embodiment of the present invention set forth in FIG. 5 illustrates a first inrush surge current limiting circuit 132 coupled to a first MOSFET driver 126 and a second inrush surge current limiting circuit 134 coupled to a second MOSFET driver 128.

First inrush surge current limiting circuit 132, comprises a first field effect transistor (FET) 136, and a first drain capacitor 138. In one embodiment, first FET 136 is an N-channel depletion mode junction field effect transistor (JFET). First JFET 136 has a source coupled to the drain of first MOSFET 112. The drain of first JFET 136 is coupled to a first terminal of first drain capacitor 138. A second terminal of first drain capacitor 138 is coupled to the gates of first MOSFET 112 and second MOSFET 114. The gate of first JFET 136 is coupled to the sources of first MOSFET 112 and second MOSFET 114 and the ungrounded terminal of first source-grounding resistor 130.

Second inrush surge current limiting circuit 134, comprises a second field effect transistor (FET) 140, and a second drain capacitor 142. In one embodiment, second FET 140 is an N-channel depletion mode junction field effect transistor (JFET). Second inrush surge current limiting circuit 134 is coupled to second MOSFET driver 128 in substantially the same manner as first inrush surge current limiting circuit 132 is coupled to first MOSFET driver 126.

Each power source 116 and 124 has a power terminal 144 and 146 respectively, for supplying power to load 118; a ground terminal 148 and 150 respectively; a positive bias terminal 152 and 154 respectively; a negative bias terminal 156 and 158 respectively; and a control terminal 160 and 162 respectively. Control terminals, 160 and 162, provide different logic level commands from a controller 48, for example a microprocessor, a microcontroller, a programmable logic device, or a state machine, etc., to open and close their associated MOSFET pairs via the MOSFET controllers 164 and 166 respectively.

In one embodiment, first MOSFET controller 164 is a suitable radiation hardened analogue switch commercially available, for example, the dual DPST HS302HR/883S available from Harris Corporation. First MOSFET controller 164 has a first bias input terminal 168; a second bias input terminal 170; a control input terminal 172; a first bias output terminal 174; and a second bias output terminal 176. First power source 116 power terminal 144 is coupled to the drain of first MOSFET 112. Ground terminal 148 is coupled to a ground reference. Positive bias terminal 152 is coupled to first bias input terminal 168 of first MOSFET controller 164. Negative bias terminal 156 is coupled to second bias input terminal 170 of first MOSFET controller 164. First power source 116 control terminal 160 is coupled to control input terminal 172 of first MOSFET controller 164. First MOSFET controller 164 first bias output terminal 174 is coupled to the gates of first MOSFET 112 and second MOSFET 114. First MOSFET controller 164 second bias output terminal 176 is coupled to the gates of third MOSFET 120 and fourth MOSFET 122, i.e., the gates of the MOSFETs of the redundant MOSFET driver.

Second MOSFET controller 166 has a first bias input terminal 178; a second bias input terminal 180; a control input terminal 182; a first bias output terminal 184; and a second bias output terminal 186. Second MOSFET controller 166 is coupled to second power source 124 in a substantially the same manner that first MOSFET controller 164 is coupled to first power source 116 with the exception that second bias output terminal 186 is coupled to the gates of first MOSFET 112 and second MOSFET 114, the gates of the MOSFETs of the redundant MOSFET driver.

Operation of first and second inrush surge current limiting circuits, 132 and 134 respectively, are substantially the same as the operation of inrush surge current limiting circuit 100 as described previously in reference to FIG. 4. The details of the operation of the power supply system 110, with dual-redundant power sources, is substantially similar to the operation described in the Willis et al. U.S. Pat. No. 5,796,274, which is incorporated by reference into the present application.

Figure 6:
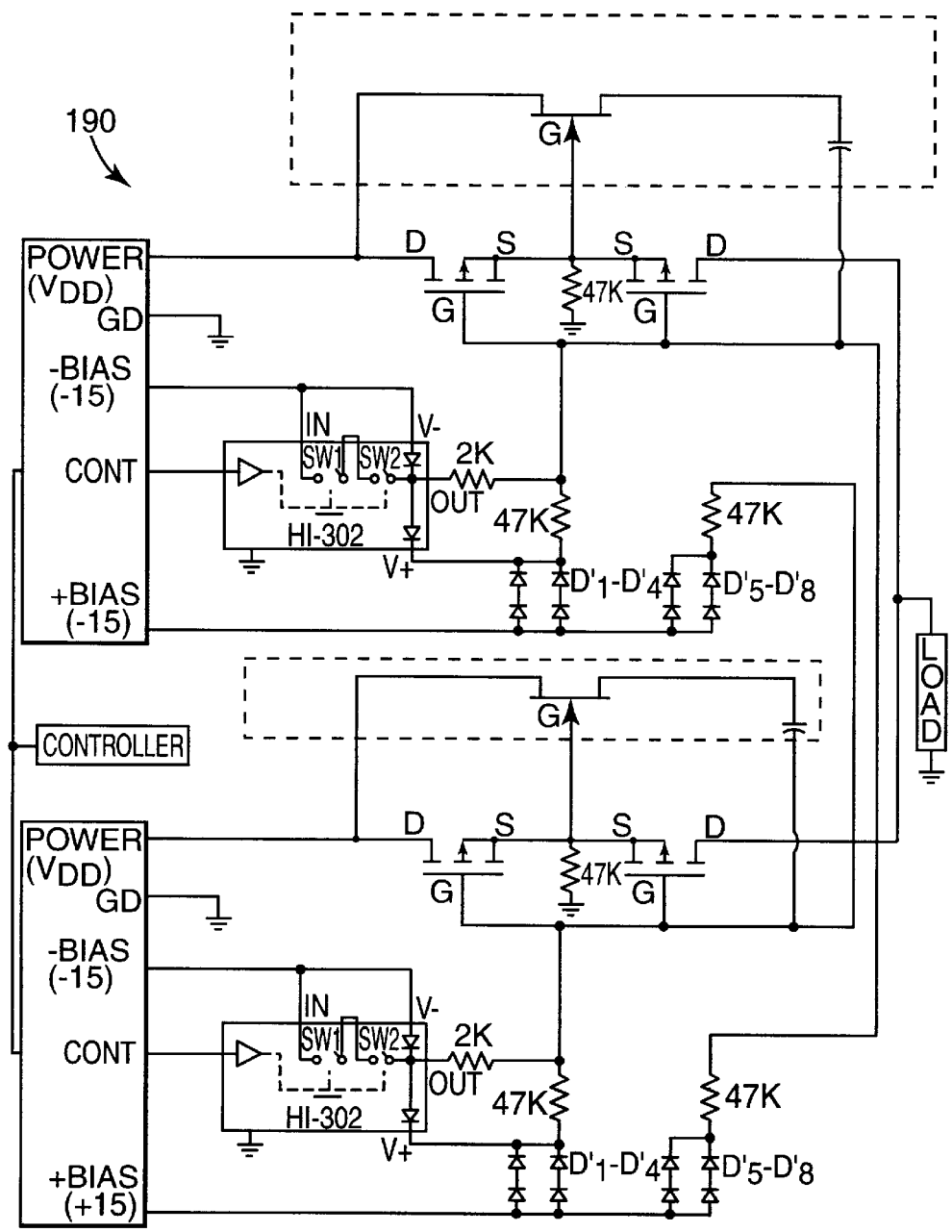
FIG. 6 is a schematic and block diagram of one embodiment of a capacitive load and a power supply system for supplying power to the capacitive load and including dual-redundant power supply sources, P-channel MOSFET drivers, and current limiting circuits according to the present invention.

Illustrated generally at 190 in FIG. 6, the invention is implemented to insure the proper control of P-channel MOSFETs. Since this driver circuit and its operation is substantially the same as that shown in FIG. 5 except changed polarities, its operation will be understood by those skilled in the art based on the above discussion corresponding to FIG. 5. However, it should be noted that Pchannel MOSFETs of FIG. 6 do not behave the same as N-channel MOSFETs of FIG. 5 under radiation exposure. That is, N-channel MOSFETs are harder to turn off, whereas P-channel MOSFETs are harder to turn on. The reason is they both experience negative threshold shifting; an equivalent to the trapped charge in the gate oxide region creating a negative battery applied in series with the gate.

The present invention can be applied in a variety of applications wherever control of transistor isolation impedance or inrush surge current is necessary. The present invention may be implemented near the source of power (i.e., when power source is switched onto a common load bus), near the load (i.e., when the load is switched onto a common power bus) or along the power distribution path intermediate to both power source and load (i.e. when power path between power source and loads is configurable).

The inrush surge current limiting circuits, 54, 100, 132, and 134 respectively, use fewer number of components than conventional methods with an accompanying reduction in cost and physical space requirements. At the same time, efficiency and reliability are improved. These benefits are particularly important in high efficiency, low-power equipment including outer-space applications and portable electronic devices, such as cellular phones, laptop computers, pagers, personal digital assistants, and the like.

JFETS are intrinsically radiation resistant since there is no oxide to store trapped charge. Therefore, the threshold voltage characteristics for JFETs are fairly independent of radiation and temperature in typical outer space environment applications. JFET gate leakage current is affected by radiation, but the magnitude is not significant enough to develop a significant offset voltage across the sourcegrounding resistor. The present invention can be implemented using readilyavailable components inherently radiation/temperature tolerant rather than limited availability, more expensive, radiation-hardened space-qualified components Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A circuit for limiting inrush surge current flowing through a transistor, having a first terminal, a second terminal, and a control terminal, the circuit comprising:
    a field effect transistor (FET) having a gate coupled to the second terminal of the transistor, a source coupled to the first terminal of the transistor, and a drain; and
    a capacitor coupled between the control terminal of the transistor and the drain of the FET.

2. The circuit of claim 1, wherein the transistor is a metal oxide semiconductor field effect transistor (MOSFET), the first terminal is a drain, the second terminal is a source, and the control terminal is a gate.

3. The circuit of claim 2, wherein the MOSFET is an N-channel power MOSFET.

4. The circuit of claim 1, wherein the FET is a depletion FET.

5. The circuit of claim 4, wherein the depletion FET is a junction field effect transistor (JFET).

6. The circuit of claim 5, wherein the JFET has a threshold voltage approximately equal to a voltage induced by inrush surge current flowing through the transistor when the transistor is partially turned on.

7. A power supply system for providing power to a capacitive load, the power supply system comprising:
    a power source having a ground terminal coupled to a ground reference, and a power terminal;
    a metal oxide semiconductor field effect transistor (MOSFET) having a drain coupled to the power source power terminal, a source coupled to the capacitive load, and a gate;
    a field effect transistor (FET) having a gate coupled to the source of the MOSFET, a source coupled to the drain of the MOSFET, and a drain; and
    a capacitor coupled between the gate of the MOSFET and the drain of the FET.

8. The power supply system of claim 7, wherein the FET is a depletion FET.

9. The power supply system of claim 8, wherein the depletion FET is a junction field effect transistor (JFET).

10. The power supply system. of claim 9, wherein the power terminal provides a voltage to the MOSFET drain and the JFET has a threshold voltage slightly smaller in magnitude than the voltage provided by the power terminal.

11. The power supply system of claim 7, wherein the MOSFET is a power MOSFET.

12. The power supply system of claim 7, wherein the power supply system further comprises:
    a MOSFET controller receiving a first bias input, a second bias input, a control input, and providing a bias output, the bias output coupled to the gates of the MOSFET; and
    wherein the power source further includes a first bias terminal providing the first bias input to the MOSFET controller, a second bias terminal providing the second bias input to the MOSFET controller, and a control terminal providing the control input to the MOSFET controller.

13. A power supply system for providing power to a capacitive load, the power supply system comprising:
    a power source having a power terminal, and a ground terminal, the ground terminal coupled to a ground reference;
    a fault tolerant metal oxide semiconductor field effect transistor (MOSFET) driver including:
        a first MOSFET having a drain coupled to the power source power terminal, a source, and a gate;
        a second MOSFET having a drain coupled to the capacitive load, a source coupled to the source of the first MOSFET, and a gate coupled to the gate of the first MOSFET; and
    a circuit for limiting inrush surge current to the capacitive load and including:
        a field effect transistor (FET) having a gate coupled to the sources of the first and second MOSFETs, a source coupled to the drain of the first MOSFET, and a drain;
        a capacitor having a first terminal and a second terminal, wherein the first terminal of the capacitor is coupled to the drain of the FET and the second terminal of the capacitor is coupled to the gates of the first and second MOSFETs.

14. The power supply system of claim 13, wherein the FET is a depletion FET.

15. The power supply system of claim 14, wherein the depletion FET is a junction field effect transistor (JFET).

16. The power supply system of claim 15, wherein the power source power terminal provides a voltage to the first MOSFET drain and the JFET has a threshold voltage slightly smaller in magnitude than the voltage provided by the power source power terminal.

17. The power supply system of claim 13, wherein the first and second MOSFETs are power MOSFETs.

18. The power supply system of claim 17, wherein the first and second power MOSFETs are N-channel power MOSFETs.

19. The power supply system of claim 17, wherein the first and second power MOSFETs are P-channel power MOSFETs.

20. The power supply system of claim 13, wherein the fault tolerant MOSFET driver further includes a resistive device coupled between the ground reference and the sources of the first and second MOSFETs.

21. The power supply system of claim 13, wherein the fault tolerant MOSFET driver further includes:
    a first MOSFET controller receiving a first bias input, a second bias input, a control input, and providing a bias output coupled to the gates of the first and second MOSFETs; and
    wherein the power source further includes:
        a positive bias terminal providing the first bias input to the first MOSFET controller, a negative bias terminal providing the second bias input to the first MOSFET controller, and a control terminal providing the control input to the first MOSFET controller.

22. The power supply system of claim 21, further comprising:
    a second power source having a second power terminal, a second ground terminal coupled to the ground reference, a second positive bias terminal, a second negative bias terminal, and a second control terminal;

a second fault tolerant MOSFET driver including:
    a third MOSFET having a drain coupled to the second positive power terminal, a source, and a gate;
    a fourth MOSFET having a drain coupled to the capacitive load, a source coupled to the source of the third MOSFET, and a gate coupled to the gate of the third MOSFET;
  a second circuit for limiting inrush surge current to the capacitive load and including:
    a second FET having a gate coupled to the sources of the third and fourth MOSFETs, a source coupled to the drain of the third MOSFET, and a drain;
    a second capacitor having a first terminal and a second terminal, the first terminal of the second capacitor coupled to the drain of the second FET, the second terminal of the second capacitor coupled to the gates of the third and fourth MOSFETs; and
  a second MOSFET controller receiving a first bias input from the second positive bias terminal of the second power source, a second bias input from the second negative bias terminal of the second power source, a control input from the second control terminal of the second power source, and providing a first bias output coupled to the gates of the third and fourth MOSFETs, a second bias output coupled to the gates of the first and second MOSFETs; and
  wherein the first MOSFET controller further provides a second bias output coupled to the gates of the third and fourth MOSFETs.

23. The power supply system of claim 22, wherein the first and second FETs are depletion mode junction field effect transistors (JFETs).

24. The power supply system of claim 23, wherein the first, second, third, and fourth power MOSFETs are P-channel power MOSFETs.

25. The power supply system of claim 23, wherein the first, second, third, and fourth MOSFETs are N-channel power MOSFETs.

26. The power supply system of claim 22, wherein:
  the power terminal of the power source provides a voltage to the first MOSFET drain;
  the second power terminal of the second power sources provide a second voltage to the third MOSFET drain;
  the first JFET has a first threshold voltage slightly smaller in magnitude than the voltage provided by the power terminal of the power source; and
  the second JFET has a second threshold voltage slightly smaller in magnitude than the second voltage provided by the second power terminal of the second power source.

27. The power supply system of claim 22, wherein the MOSFET driver further includes a first resistive device coupled between the ground reference and the sources of the first and second MOSFETs, and a second resistive device coupled between the ground reference and the sources of the third and fourth MOSFETs.

28. A method of energizing a capacitive load and limiting an inrush surge current flowing to the capacitive load coupled to a power supply system through a transistor, the method comprising:
  maintaining an isolation impedance of the transistor at a first level to inhibit power flow to the capacitive load;
  decreasing the isolation impedance of the transistor from the first level to a second level to provide power to the capacitive load;
  sensing a voltage drop across the isolation impedance;
  maintaining the sensed voltage drop at a threshold level for a fixed period of time; and
  decreasing the isolation impedance of the transistor from the second level to a third level.

29. A method of energizing a capacitive load and limiting an inrush surge current flowing to the capacitive load coupled to a power supply system through a transistor having a control terminal and a reference terminal, the method comprising:
  applying a bias voltage of a first level, which is below the transistor threshold voltage level, across the control terminal and the reference terminal of the transistor to maintain the transistor in an off state;
  increasing the bias voltage to a second level, which is above the transistor threshold voltage level, across the control terminal and the reference terminal to thereby create a transistor control terminal charging current;
  diverting a portion of the transistor control terminal charging current from the transistor control terminal for a delay time to keep the transistor only partially turned on and limit the power supply current through the transistor for the delay time;
  charging the capacitive load during the delay time with the limited power supply current through the transistor; and
  increasing the transistor control terminal charging current to the transistor control terminal to fully turn on the transistor.

30. The method of claim 29, wherein the transistor is a metal oxide semiconductor field effect transistor (MOSFET).

31. The method of claim 29, further comprising:
  charging a drain capacitor up to the bias voltage second level for the delay time by applying the bias voltage second level across the drain capacitor; and
  discharging the drain capacitor.

32. The method of claim 29, further comprising:
  controlling the diverting step and thereby the delay time with a field effect transistor (FET) having a gate coupled to a source of the MOSFET.

* * * * *